Figure 1:
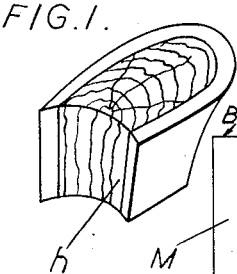

Dec. 19, 1961    H. LEYMARIE    3,013,928
PROCESS OF MOULDING A THERMOPLASTIC SHEET
BY MEANS OF DRAPE FORMING
Filed Oct. 8, 1956    2 Sheets-Sheet 1

Inventor
Hubert Leymarie
By
Stevens, Davis, Miller & Mosher
Attorneys

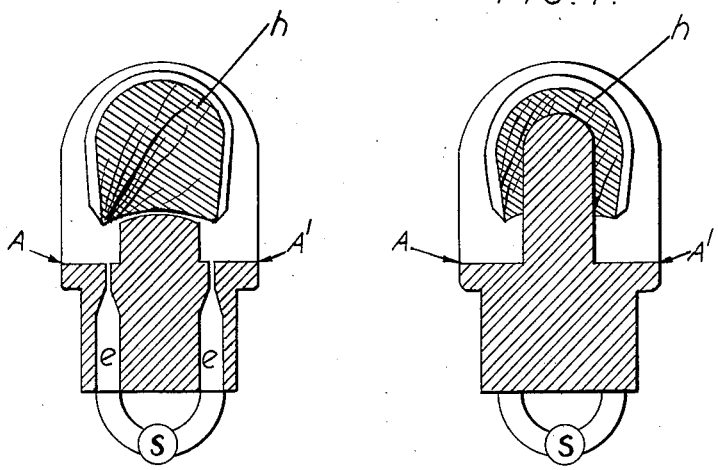

United States Patent Office 3,013,928
Patented Dec. 19, 1961

3,013,928
PROCESS OF MOULDING A THERMOPLASTIC
SHEET BY MEANS OF DRAPE FORMING
Hubert Leymarie, Lyon, France, assignor to Societe des
Usines Chimiques Rhone-Poulenc, Paris, France, a corporation of France
Filed Oct. 8, 1956, Ser. No. 614,616
Claims priority, application France Dec. 7, 1955
2 Claims. (Cl. 156—475)

This invention relates to the moulding of thermoplastic sheets.

The suction moulding of thermoplastic sheets has, in addition to considerable advantages, the disadvantage that it produces articles of irregular thickness. Furthermore, if good results are to be obtained, such moulding requires a special design of the moulds or patterns, because those details of the mould or pattern which would involve excessive drawing of the thermoplastic material at the time of moulding might not "take." The method known as "drape forming" which consists in stretching over a mould in relief immediately before the suction a hot thermoplastic sheet maintained in a rigid clamp, certainly represents an advance over the preceding method, because the objects obtained have a less irregular thickness. However, this method has other disadvantages, because the drawing of the thermoplastic sheet between the clamp and the mould at the time of the "draping" often exceeds 100%. This necessitates, on the one hand, the use of blanks of much greater thickness than the article to be obtained (which blanks are therefore more difficult to heat), and on the other hand correspondingly reduces the drawing which can be produced at the time of the suction. There is for each thermoplastic material a total maximum drawing which cannot be exceeded for a given degree of softening.

The present invention relates to an improvement in the process of moulding by drape forming, which is characterised in that the blank clamp intended to maintain the sheet of thermoplastic material is not rigid as in the prior processes, but deformable so that, when the sheet has been softened by any appropriate means, it can be draped around the mould over the greater part of its useful surface without any appreciable drawing. Under these conditions, the suction subsequently applied in order to force the thermoplastic sheet against all the details of the mould produces only a slight displacement of the softened material. Consequently, the moulded articles have a very regular thickness which does not differ substantially from that of the initial sheet, and all the details of the mould clearly appear on the finished article.

Thus, according to the present invention there is provided a process of moulding a thermoplastic sheet by drape forming comprising clamping the sheet in a clamp having relatively movable parts so that one edge of the sheet is held by one of said parts and the opposite edge of the sheet is held by another of said parts, softening the sheet, placing the said parts of the clamp adjacent opposite sides of a mould so that the greater part of the sheet lies adjacent the mould, and aspirating the air between the sheet and the mould, whereby moulding of the sheet is effected while appreciable drawing of the sheet throughout said greater part is avoided.

The clamp employed in the process of the present invention may consist, for example, of two oppositely disposed jaws which are so pivotally connected as to be able to move with respect to one another. The pivotal connection between the jaws may be constituted by a metal pin or by strips of flexible material (e.g. thin sheet steel or rubber sheeting). The jaws of the clamp may also be independent of one another, the movement of each of them being separately effected. The clamp may be manipulated by hand or by means of any appropriate mechanical device. It may be advantageous in some cases to use in addition an auxiliary clamp for perfecting the fluid-tightness between the thermoplastic sheet and the mould or for improving the draping of the latter.

The invention will hereinafter be described, merely by way of example, with reference to the coating of the heels of ladies' shoes.

The coating of wooden heels of ladies' footwear is generally effected by sticking on the heels by hand a sheet of nitrocellulose material previously softened in a bath having an alcohol base. This coating must be such that the plastic material covers not only the visible portion of the heel but also the edge of the three other faces of the wood. It is unnecessary to emphasise the disadvantages of such a process, which is very slow and necessitates considerable labour if it is desired to obtain a high rate of production. By means of the present invention, this coating operation can be very readily and very economically effected by suction, as will hereinafter be apparent.

Figure 2:
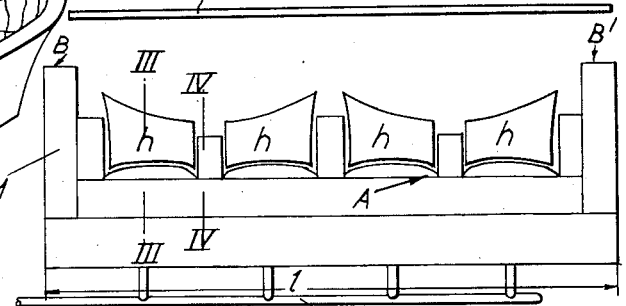
Figure 5:
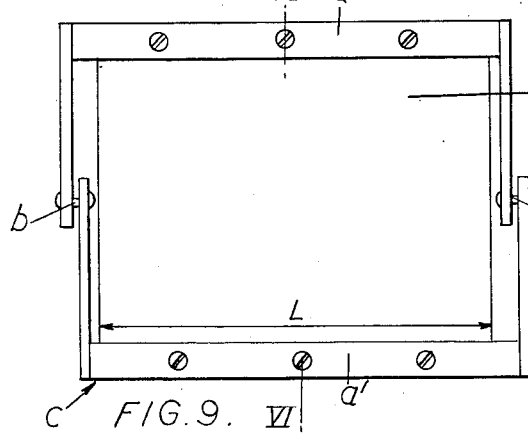
Figure 6:
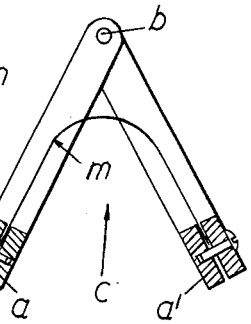
Figure 9:
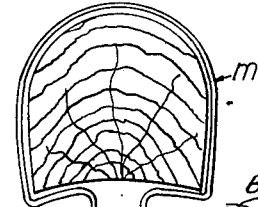
Figure 8:
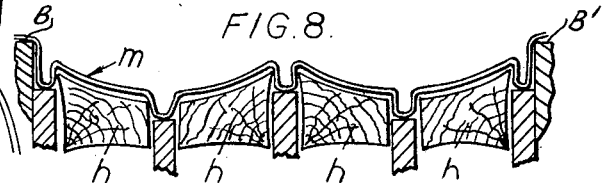

In the accompanying drawings:

FIGURE 1 is a perspective view of the heel of a lady's shoe coated with a layer of thermoplastic material by means of the process according to the present invention, FIGURE 2 is a side view of a mould containing a plurality of shoe heels to be coated, FIGURES 3 and 4 are sections taken respectively on the lines III—III and IV—IV of FIGURE 2 and drawn to an enlarged scale, FIGURE 5 is a plan view of a clamp which may be used in the process according to the invention, FIGURE 6 is a section on the line VI—VI of FIGURE 5, FIGURE 7 is a view corresponding to FIGURE 3 but illustrating the placing of the clamp in position with respect to the mould, and FIGURES 8 and 9 show the shoe heels coated with a layer of thermoplastic material as a result of the process according to the invention.

Referring to the drawings, a plurality of wooden shoe heels $h$ are placed in a mould M provided with a plurality of spaced air vent holes $e$ which are connected to a suction line $s$. The mould M may be of wood or of any other suitable material.

A blank $m$ of length L is cut from a thermoplastic sheet (not shown) which may, for example, be of plasticised cellulose acetate. It is arranged that the length L of the blank is greater (e.g. by about 0.5 cm.) than the length $l$ of the mould M.

The blank $m$ is then clamped in a clamp C (see FIGURES 5 and 6) which consists of two U-shaped frame sections pivotally connected at their upright ends by pins $b$ and $b'$ and having jaws $a$ and $a'$ disposed along their lower horizontal members for gripping the opposed ends of the blank $m$.

The blank is placed beneath an infra-red radiant panel R and is thereby softened in a relatively short time. As soon as the optimum softening has been effected, the clamp C is lowered over the mould M as indicated in FIGURE 7, the jaws $a$ and $a'$ being disposed to opposite sides of the mould and the blank $m$ being so disposed that the greater part of the blank lies adjacent the heels $h$. As soon as the blank has come into contact with the surfaces B and B' and the edges A and A' of the mould M (FIGURES 2, 3 and 4) the air contained between the blank and the mould is aspirated. As a result of the aspiration, the material covers each heel $h$. The material is allowed to solidify in this position, and after cooling the solidified blank is removed and at the same time the heels which remain enclosed by the moulded material. This is illustrated in FIGURES 8 and 9. It is then merely necessary to cut away the excess thermoplastic material which has not been applied to the heels, in order to obtain the covered heel as shown in FIGURE 1.

It will be appreciated that the mould M is so designed that:

(a) The wooden heels *h* to be coated may be disposed in the mould one behind the other, the said heels serving as moulds for the blank *m*.

(b) Fluid-tightness is ensured between the blank *m* and the mould M at the time of the draping with a slight drawing on the two jaws *a* and *a'* of the clamp C.

(c) The drawing of the blank *m* between and below the wooden heels *h* is limited so as to avoid tearing of the material, which would inevitably occur at these points at the time of the suction of the air through the vent holes *e*.

(d) The combined blank and wooden heels may readily be removed from the mould after suction.

The invention is naturally not limited to the preceding example and it may, for instance, be carried into practice for producing articles moulded in recessed form or in relief which do not comprise, as in the example given, a support for the plastic sheet.

Naturally, there may be employed in the process according to the invention any thermoplastic materials such, for example, as plasticised cellulose derivatives, polystyrolene and copolymers, vinyl and acryl polymers and copolymers, or polyethylenes.

I claim:

1. Apparatus for use in covering articles with a layer of thermoplastic material which comprises a mould box, a suction line connected with the bottom of the box for evacuating air from the interior thereof, structure defining a plurality of spaced air vents communicating with said suction line, means disposed above each of said air vents for receiving articles to be covered and for holding the same in position while thermoplastic material is drawn down about the supported articles by suction applied through said air vents, and clamping means for thermoplastic sheet material arranged above said article receiving means, said clamping means comprising two U-shaped sections pivotally connected together at their upright ends and having jaws disposed along their lower horizontal members for gripping the opposed ends of said sheet material, said jaws being movable towards each other to cause the ends of the sheet held by said jaws to be moved downwardly towards said air vents.

2. Apparatus for use in covering articles with a layer of thermoplastic material which comprises a mould box, a suction line connected with the bottom of the box for evacuating air from the interior thereof, structure defining a plurality of spaced air vents communicating with said suction line, means disposed above each of said air vents for receiving articles to be covered and for holding the same in position while thermoplastic material is drawn down about the supported articles by suction applied through said air vents, said means comprising a support for an individual article to be covered and end walls defining with said thermoplastic sheet, when the latter is in contact with the top face of said support, a suction chamber containing at least one air vent as aforesaid and clamping means for thermoplastic sheet material arranged above said article-receiving means, said clamping means comprising two U-shaped sections pivotally connected together at their upright ends and having jaws disposed along their lower horizontal members for gripping the opposed ends of said sheet material, said jaws being movable towards each other thus to cause the sheet held by them partially to envelop the said article when arranged on said support.

References Cited in the file of this patent

UNITED STATES PATENTS

| | | |
|---|---|---|
| 2,486,761 | Pfeiffer | Nov. 1, 1949 |
| 2,731,654 | Nowak | Jan. 24, 1956 |
| 2,781,078 | Dovidio | Feb. 12, 1957 |